(12) United States Patent
Delshadpour et al.

(10) Patent No.: US 11,005,531 B1
(45) Date of Patent: May 11, 2021

(54) SYSTEM AND METHOD FOR COMMUNICATING OVER A SINGLE-WIRE TRANSMISSION LINE

(71) Applicant: NXP B.V., Eindhoven (NL)

(72) Inventors: Siamak Delshadpour, Phoenix, AZ (US); Brad Gunter, Phoenix, AZ (US); Steven Daniel, Gilbert, AZ (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/846,829

(22) Filed: Apr. 13, 2020

(51) Int. Cl.
*H04B 3/54* (2006.01)

(52) U.S. Cl.
CPC ............. *H04B 3/542* (2013.01); *H04B 3/544* (2013.01); *H04B 3/546* (2013.01); *H04B 3/548* (2013.01)

(58) Field of Classification Search
CPC ......... H04B 3/546; H04B 3/548; H04B 3/544
See application file for complete search history.

(56) References Cited

U.S. PATENT DOCUMENTS

| | | | | |
|---|---|---|---|---|
| 3,017,109 A * | 1/1962 | Briggs | ...................... | H03K 7/08 708/835 |
| 6,732,217 B1 * | 5/2004 | Nishikido | ............... | G08C 13/02 710/106 |
| 6,879,096 B1 * | 4/2005 | Miyazaki | .............. | G09G 3/2011 313/292 |
| 7,454,644 B2 * | 11/2008 | Giovinazzi | ............ | G11C 5/066 713/500 |
| 7,792,196 B2 * | 9/2010 | Sheiman | ................ | H04L 25/026 375/257 |
| 8,165,740 B2 * | 4/2012 | Kraemer | ............. | H04L 25/4902 701/32.7 |
| 8,232,667 B2 * | 7/2012 | Abraham | ................ | H04B 3/548 307/3 |
| 9,731,697 B2 * | 8/2017 | Huot-Marchand | ....... | B60T 8/36 |
| 9,812,825 B2 * | 11/2017 | Austermann, III | ...... | H04B 3/54 |
| 9,954,287 B2 * | 4/2018 | Henry | ...................... | H04B 3/52 |
| 9,967,173 B2 * | 5/2018 | Gross | ................. | H02J 13/00007 |
| 10,547,545 B2 * | 1/2020 | Barzegar | ................. | H04L 45/74 |
| 10,630,314 B1 * | 4/2020 | Kulkarni | ................. | H03M 9/00 |
| 2003/0123590 A1 * | 7/2003 | Saitou | ....................... | H04B 3/50 375/354 |
| 2003/0212440 A1 * | 11/2003 | Boveja | ............... | A61N 1/36007 607/46 |
| 2005/0060474 A1 * | 3/2005 | Eng | ......................... | B64G 1/428 710/305 |
| 2005/0135444 A1 * | 6/2005 | Krishnaswami | ........ | H01S 5/042 372/38.02 |
| 2006/0056855 A1 * | 3/2006 | Nakagawa | .............. | H05B 47/19 398/183 |

(Continued)

FOREIGN PATENT DOCUMENTS

| DE | WO2005015816 A1 | 2/2005 | |
|---|---|---|---|
| FR | WO2002103701 A1 | 12/2002 | |
| WO | WO-2008029312 A2 * | 3/2008 | ......... G06K 19/0701 |

*Primary Examiner* — Berhanu Tadese

(57) ABSTRACT

A signal generator includes a data source, a power source, and a modulator. The modulator is configured to modulate a power signal from the power source with a data signal from the data source to generate a modulated power signal. Data values of the data signal correspond to variations in a voltage level of the modulated power signal over time. The modulator is coupled to output the modulated data signal to a one-wire interface.

19 Claims, 10 Drawing Sheets

(56) References Cited

U.S. PATENT DOCUMENTS

| | | | |
|---|---|---|---|
| 2006/0077046 A1* | 4/2006 | Endo | H04B 3/54 340/12.33 |
| 2006/0187015 A1* | 8/2006 | Canfield | H04B 3/548 340/474 |
| 2007/0069135 A1* | 3/2007 | Kraft | G01S 13/931 250/339.12 |
| 2007/0080154 A1* | 4/2007 | Ott | B23K 9/095 219/132 |
| 2008/0311867 A1* | 12/2008 | Araki | H03D 3/007 455/127.2 |
| 2009/0045764 A1* | 2/2009 | Hoogzaad | G11B 19/20 318/503 |
| 2009/0195192 A1* | 8/2009 | Joseph | H05B 47/185 315/307 |
| 2010/0017553 A1* | 1/2010 | Laurencin | G06F 13/4027 710/307 |
| 2010/0079262 A1* | 4/2010 | Van Laanen | H04B 3/54 340/12.32 |
| 2010/0091921 A1* | 4/2010 | Den Besten | H04L 7/0008 375/354 |
| 2010/0289343 A1* | 11/2010 | Covaro | H04B 14/026 307/149 |
| 2011/0248673 A1* | 10/2011 | Aerts | H02J 50/12 320/108 |
| 2012/0083902 A1* | 4/2012 | Daum | H04B 3/548 700/3 |
| 2012/0128081 A1* | 5/2012 | Hikihara | H04B 3/56 375/257 |
| 2012/0155559 A1* | 6/2012 | Yamasaki | H04L 25/0284 375/257 |
| 2012/0228927 A1* | 9/2012 | Matsumoto | H04B 3/548 307/3 |
| 2013/0182781 A1* | 7/2013 | Matsutani | H04B 3/54 375/257 |
| 2014/0091732 A1* | 4/2014 | Lekatsas | H05B 45/3725 315/307 |
| 2014/0093002 A1* | 4/2014 | Lekatsas | H04B 3/548 375/259 |
| 2014/0204860 A1* | 7/2014 | Kim | D06F 34/10 370/329 |
| 2015/0074306 A1* | 3/2015 | Ayyagari | G06F 13/4072 710/110 |
| 2016/0204831 A1* | 7/2016 | Isoda | H04B 3/544 375/257 |
| 2016/0241233 A1* | 8/2016 | Kasanyal | H03K 17/687 |
| 2017/0024354 A1* | 1/2017 | Zhang | G06F 13/4291 |
| 2017/0033834 A1* | 2/2017 | Gross | H04B 3/52 |
| 2017/0072688 A1* | 3/2017 | Sano | B41J 2/04593 |
| 2018/0261925 A1* | 9/2018 | Gerszberg | H04B 1/40 |
| 2018/0331720 A1* | 11/2018 | Adriazola | H01Q 1/1228 |
| 2018/0331721 A1* | 11/2018 | Adriazola | H01Q 1/12 |
| 2019/0033903 A1* | 1/2019 | Abouda | G05F 1/56 |
| 2019/0140938 A1* | 5/2019 | Barzegar | H01Q 3/30 |
| 2019/0141714 A1* | 5/2019 | Willis, III | H04B 3/52 |
| 2019/0173435 A1* | 6/2019 | McLaren | H03F 3/60 |
| 2019/0174506 A1* | 6/2019 | Willis, III | H04W 72/085 |
| 2019/0283894 A1* | 9/2019 | Hall | H04B 10/807 |
| 2019/0285458 A1* | 9/2019 | Hall | G01F 23/263 |
| 2020/0059264 A1* | 2/2020 | Yamashita | H04L 29/02 |
| 2020/0272120 A1* | 8/2020 | Fujimura | H03K 17/6871 |
| 2020/0349988 A1* | 11/2020 | Schat | G01R 31/3177 |

* cited by examiner

SYSTEM AND METHOD FOR COMMUNICATING OVER A SINGLE-WIRE TRANSMISSION LINE

Example embodiments disclosed herein relate generally to controlling transfer of power and data signals over a single-wire transmission line.

BACKGROUND

Various attempts have been made to communicate signals between devices in a more efficient manner, both in terms of cost and performance. The lines used to carry the signals may be bus lines and traces on a printed circuit board, as well as conductors used in a variety of other contexts. Existing attempts for controlling signal communications require the use of an excessive number of pins and/or line drivers that consume large amounts of power. These and other drawbacks associated with signal communications (especially, but not exclusively, between chips) have not been adequately addressed.

SUMMARY

In accordance with one or more embodiments, a signal generator includes a power transistor configured to output a power signal to a power line; a modulator configured to modulate the power signal with first data values in a first mode to generate a modulated power signal, the modulator coupled to output the modulated data signal to a one-wire interface; and a pull-up circuit configured to apply a voltage signal to the power line in a second mode, the voltage modulated with second data values to generate a modulated voltage signal coupled for transmission to the one-wire interface, wherein first data values correspond to variations in a voltage level of the modulated power signal in the first mode and the second data values correspond to variations in a voltage level of the modulated voltage signal in the second mode. The first mode may include a period when the power transistor is in an on state and the second mode may include a period when the power transistor is in an off state.

The modulator may include a data source coupled to the power line and configured to provide the first data values and the second data values. The pull-up circuit and the data source may be coupled to a same node, and the node may be coupled to an output terminal of the power transistor. The data source may include at least one transistor coupled between a reference potential and the power line, wherein the at least one transistor includes a gate coupled to a data source and is configured to control generation of the first data values in the first mode and the second data values in the second mode. The data source may include at least one transistor coupled between a current source and the power line, wherein the at least one transistor includes a gate coupled to a data source and is to control generation of the first data values in the first mode and the second data values in the second mode.

The modulator may include a node coupled to the data line and the node may superimpose the first data values from the data source onto the power signal in the first mode. The power line may be coupled to a node, the node may be coupled to the pull-up circuit and the data source, and the node may superimpose the second data values from the data source onto the voltage signal in the second mode. The power line may be coupled to a node, the node may be coupled to the data source and the pull-up circuit, and the node may superimpose the first data values from the data source onto the power signal in the first mode and may superimpose the second data values from the data source onto the voltage signal in the second mode. The power line may be coupled to a node, the node may be coupled to the pull-up circuit and the data source, and the node may superimpose the second data values from the data source onto the voltage signal in the second mode.

In accordance with one or more embodiments, a method for controlling signal communications includes outputting a power signal to a power line; modulating the power signal with first data values in a first mode to generate a modulated power signal; modulating a voltage signal on the power line in a second mode to generate a modulated voltage signal; coupling the modulated power signal to a one-wire interface in the first mode; and coupling the modulated voltage signal to the one-wire interface in the second mode, wherein first data values correspond to variations in a voltage level of the modulated power signal in the first mode and the second data values correspond to variations in a voltage level of the modulated voltage signal in the second mode. The first mode may include a period when a power transistor coupled to the power line is in an on state and the second mode may include a period when the power transistor is in an off state.

The method may include outputting the first data values and the second data values from a data source to the power line. The voltage signal may be received from a pull-up circuit coupled to the power line. The pull-up circuit and the data source may be coupled to a same node and the node may be coupled to an output terminal of the power transistor.

The data source may include at least one transistor coupled between a reference potential and the power line, wherein the at least one transistor includes a gate coupled to a data source and is configured to control generation of the first data values in the first mode and the second data values in the second mode. The data source may include at least one transistor coupled between a current source and the power line, wherein the at least one transistor includes a gate coupled to a data source and is configured to control generation of the first data values in the first mode and the second data values in the second mode.

The power line may be coupled to a node, the node may be coupled to the data source and a pull-up circuit of the voltage signal, and the node may superimpose the second data values from the data source onto the voltage signal in the second mode. The power line may be coupled to a node, the node may be coupled to the data source and a pull-up circuit of the voltage signal, and the node may superimpose the first data values from the data source on the power signal in the first mode and superimposes the second data values from the data source onto the voltage signal in the second mode.

BRIEF DESCRIPTION OF THE DRAWINGS

Additional objects and features of the invention will be more readily apparent from the following detailed description and appended claims when taken in conjunction with the drawings. Although several example embodiments are illustrated and described, like reference numerals identify like parts in each of the figures, in which:

DETAILED DESCRIPTION

Figure 1:
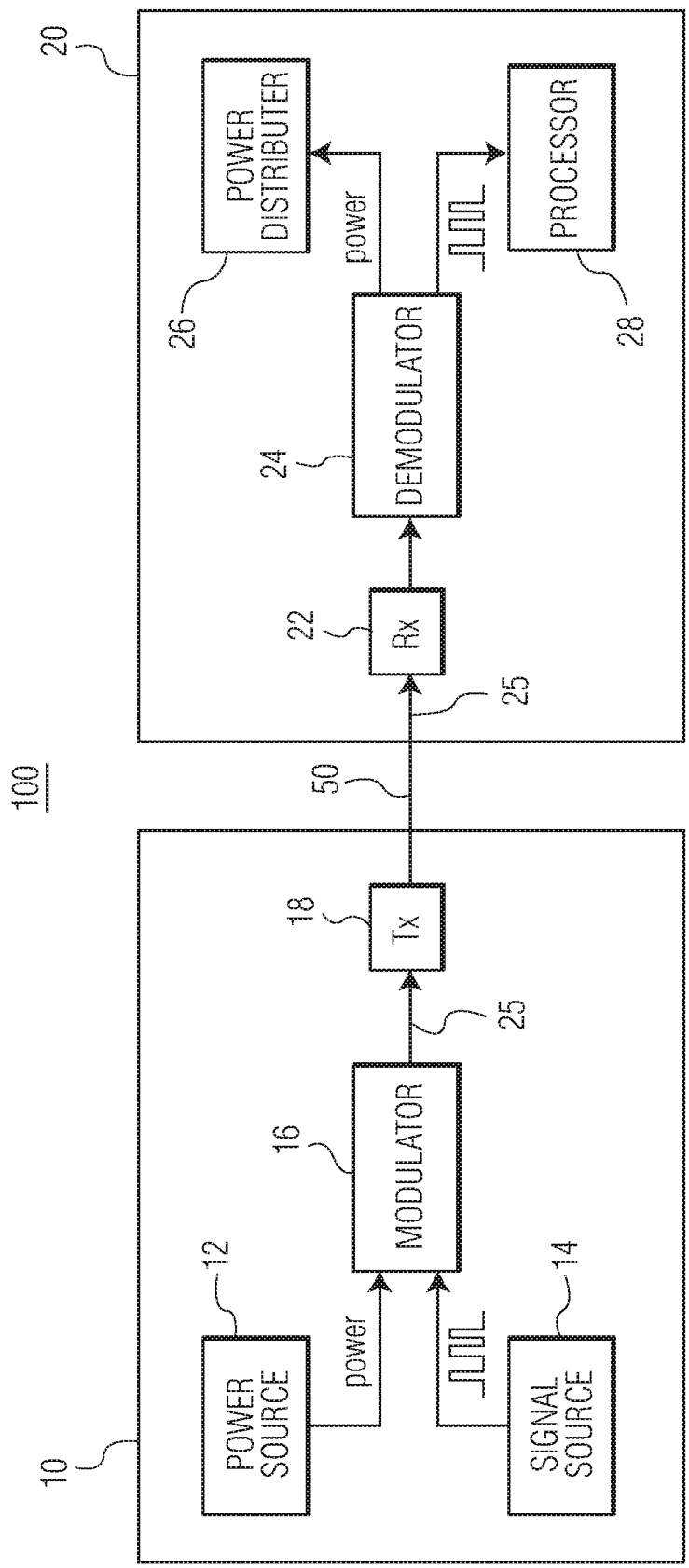
FIG. 1 illustrates a signal generating system with a one-wire interface.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various example embodiments described herein are not necessarily mutually exclusive, as some example embodiments can be combined with one or more other example embodiments to form new example embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

FIG. 1 illustrates a system 100 for controlling communications over a one-wire interface (OWI) 50, which, for example, may be a single-wire conductor (communication line) coupled between a first device 10 and a second device 20.

The first device 10 may be a first semiconductor device and the second device 20 may be a second semiconductor device. For example, the first device may correspond to a first integrated circuit chip and the second device may correspond to a second integrated circuit chip. In this case, the single-wire conductor 50 may be a trace or other type of conductive line on or coupled to a printed circuit board on which both chips are mounted. The chips may be mounted on separate printed circuit boards, for example, within a same host device. The single-wire conductor may be a transmission line connecting the first and second devices, which are spaced or separated from one another. This latter case may apply for larger scale applications. The first and second devices will be discussed as corresponding to different chips mounted on a same printed circuit board.

The first chip 10 may serve as a transmitter, both of power and communication signals that are sent to the second chip 20 over the single-wire conductor 50. The communication signals may include data signals that conform to any one of a variety of standards or protocols, including but not limited to universal asynchronous receiver/transmitter (UART) protocol, inter-integrated circuit (I2C) protocol, and universal serial bus (USB) protocol. The signals may or may not be coded before transmission. The transmitter chip 10 may perform half-duplex communications over conductor 50, e.g., transmit power and communication signals to the second chip 20 over the single-wire conductor 50, but may not receive power and/or communication signals from the second chip over that conductor. Full-duplex communications may be performed over the single-wire conductor 50, e.g., chips 10 and 20 may receive power and/or communication signals from one another over the single-wire conductor 50.

Referring to FIG. 1, the first chip 10 includes a power source 12, a signal source 14, a modulator 16, and a transmitter 18. The power source 12 provides power within a predetermined range in order to meet the requirements of the intended application of the second chip 20. The power source may be the system or generator originating the power or an interface (e.g., an IC pin) which receives power from the originating system or generator. Power may be received by first chip 10, for example, from a host system or device or may be received from a secondary power source. The power may be alternating current (AC) power or direct current (DC) power, which in this latter case may come from a battery. For illustrative purposes, the power output from source 12 will be considered as power signals.

The signal source 14 provides the communication signals that are to be combined and simultaneously transmitted with the power signals to the second chip. The communication signals may be data signals, control signals, or other types of signals which are to be used or processed by a circuit of the second chip for the intended application or which are to be transmitted through the chip to a load. The data signals may be encoded (or serialized) and/or pre-modulated by the signal source, for example, to form pulse width modulated (PWM) signals and pulse-amplitude modulation (PAM) signals, as well as other types of signals. The signal source may output analog signals, which are then converted to digital signals and combined with the power signals in modulator 16.

The modulator 16, as indicated, combines the power signals output from the power source and the communication (e.g., data) signals output from the signal source to generate a modulated power signal. Put differently, the modulator may modulate the power signals with the data signals to generate a combined signal 25 for transmission by the transmitter 18. In one embodiment, the transmitter circuit may include or be coupled to a digital-to-analog converter for purposes of transmitting an analog signal to the second chip 20. In this case, the second chip would include an analog-to-digital converter to recover the modulated digital signal. Once formed, the transmitter 18 transmits the combined signal to the second chip through the single-wire conductor 50. The modulation performed by modulator 16 ensures that the combined signal fits within the communication bandwidth of the single-wire conductor 50, so that no portion of the power or data signal is lost during transmission.

Figure 2A:
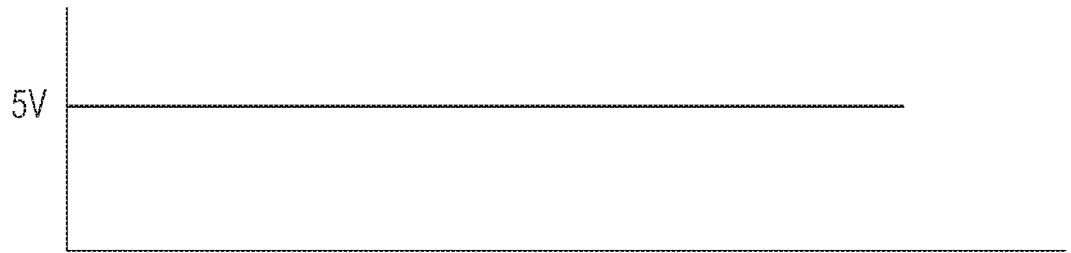
FIGS. 2A to 2C illustrate an example for modulating a power or voltage signal with data.
Figure 2B:
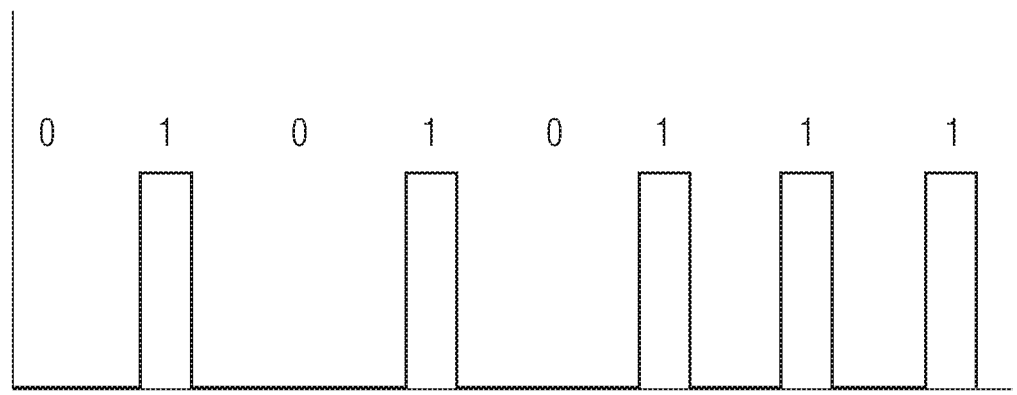
Figure 2C:
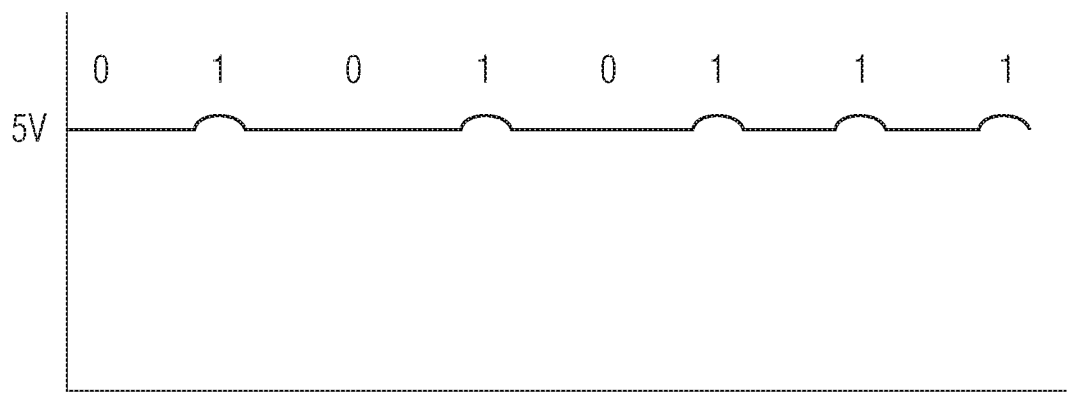

FIGS. 2A to 2C illustrates an example of how a power signal (or voltage signal) may be modulated with data values by modulator 16 of chip 10. In FIG. 2A, the power signal 210 is illustrated as a 5V DC signal. In FIG. 2B, the data signal 220 is shown as a series of data values. In operation, the modulator 16 modulates the digital (bit) values of the data signal with the DC power signal to generate a combined signal 230 (e.g., modulated power signal) for transmission over the single-wire conductor 50. A similar superposition of data values onto a voltage signal may occur, for example, in the manner discussed relative to FIGS. 8A and 8B. The shown signal which is equal to "1" has been shown higher than 5V signal, but it is not limited to that and can be lower than 5V. A voltage difference between "0" and "1" over 5V signal that can be detected by receiver is enough.

Returning to FIG. 1, the second chip 20 includes a receiver 22, a demodulator 24, a power distributor 26, and a processor 28. The receiver 22 receives the modulated power signal (e.g., the power signal that has been integrally combined with the data signal) in digital or analog form.

The demodulator 24 demodulates the modulated power signal, for example, by performing an inversion of the modulation and/or encoding techniques used by the modulator 16 in the first chip 10, to thereby separate the power signal from the data signal. The power signal may then be output to the power distributor 26, which may transfer one or more different levels of power (e.g., using an internal power manager) to corresponding logical blocks of the second chip and/or which may transmit all or a portion of the power to an external load. The data signal may be output to the processor 28, which processes the data according to the intended application of the chip 20.

Figure 3:
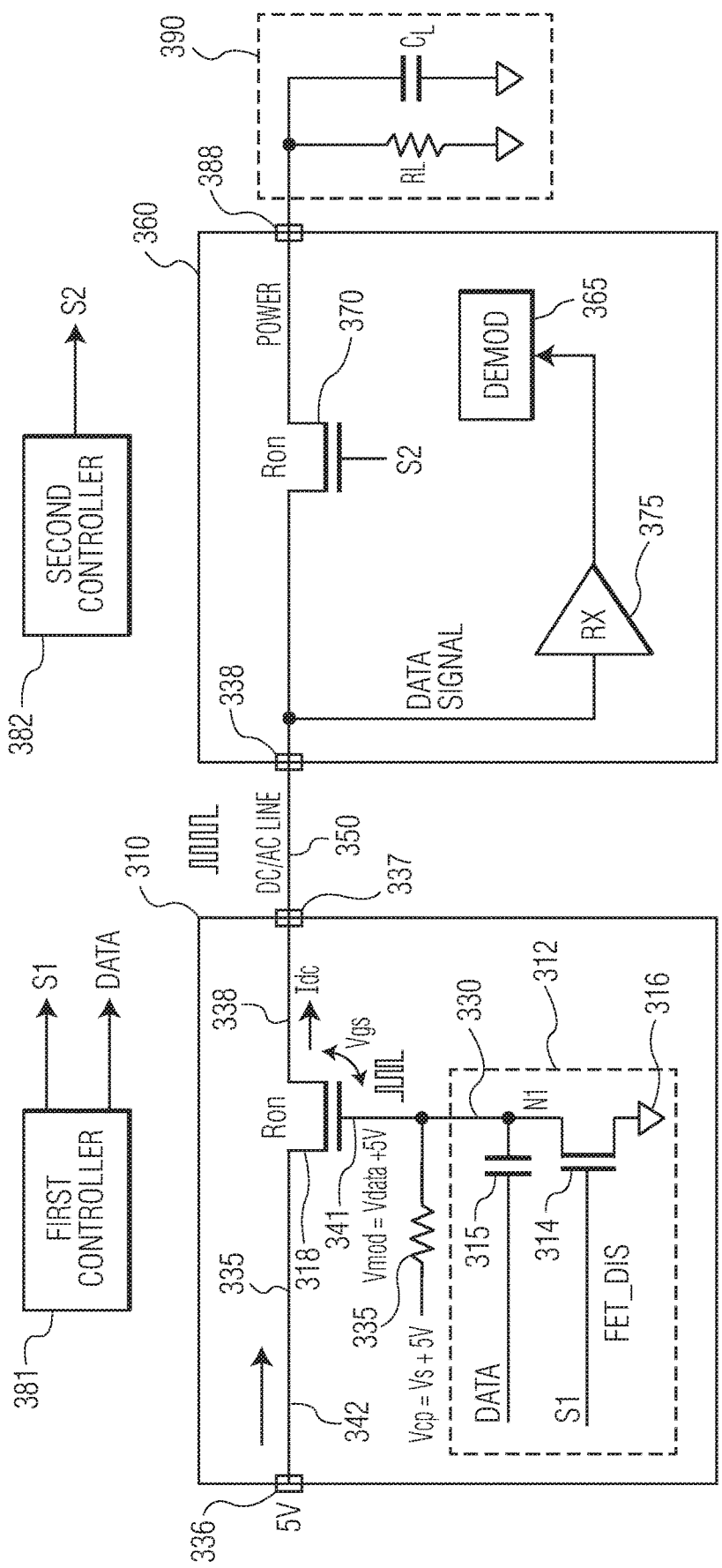
FIG. 3 illustrates one type of signal communication over single wire.

FIG. 3 illustrates a first chip 310 and a second chip 360, which may be example implementations of first chip 10 and second chip 20 in FIG. 1, respectively. The first chip 310 includes a signal source 312 and a first power metal-oxide semiconductor field effect transistor (FET) 318 that is controlled to generate a modulated power signal based on data and a power signals.

The signal source 312 includes a switch 314 and a capacitor 315. The switch 314 is coupled between a node N1 to which the capacitor is coupled and a reference potential 316, which, for example, may be ground. The switch 314 may include a transistor (e.g., n-type FET) having a gate coupled to receive a control signal from a first controller 381. The capacitor 315 may receive data from the same controller 381. The data and control signals output from the first controller may be synchronized to generate a data signal that is modulated onto a power signal transmission to the second chip 320.

The data signal may be generated as follows. Initially, the first controller 381 may generate a switching signal S1 as a gate signal for transistor 314 that has a logical one value. The logical one value causes transistor 314 to conduct, pulling the node N1 to ground. This removes any residual voltage that may be stored at node N1. Then, the first controller 381 may generate control signal S1 to have a logical zero value that turns transistor 314 off in preparation for modulating a data signal onto the power signal. Once transistor 314 has been turned off, the first controller 381 outputs a serial stream of one or more data values that are received by capacitor 315. The data values binary bit values or signal values of two or more levels. In the case of bit values, the data values may assume a first voltage corresponding to a logical zero value or a second voltage corresponding to logical one value. These values are received by capacitor 315, which may then capacitively couple these values to node N1. Through these operations, the data source is able to generate a data signal 330 that include a series of logical values (or signal levels) for input into the first power FET 318.

The first power FET 318 is controlled to modulate a power signal based on the data signal 330 from the data source. The power signal 335 may be, for example, a DC signal with a predetermined voltage that corresponds to a turn-on voltage (e.g., gate-source Vgs) of the power FET. The DC signal may be received from an off-chip power source through an input pin 336, which may be coupled to a drain of the first power FET as illustrated in FIG. 3. This may be accomplished by controlling switching of the first power FET 318 based on the data signal. For example, in operation, the gate voltage of the first power FET (e.g., n-type) 318 is modulated based on the data signal output from the data source. This modulation may take place, for example, based on the changing logical values corresponding to the different bits (or levels) in the data signal.

In operation, the gate signal line 341 of the first power FET has a voltage generated as a result of a parasitic capacitance with the power signal line 342. This parasitic capacitance biases the gate line of the first power FET with a voltage (charge pump voltage) Vcp that equals or is based on the voltage of the power signal, which is 5V in this example. The charge pump voltage Vcp corresponds to a sum of the source voltage of power FET 318 and the voltage of the power signal, e.g., Vcp=Vs+5V. The charge pump voltage Vcp may be slightly less than the power signal voltage because of, for example, a resistance associated with the gate signal line of the first power FET. This is symbolically shown by resistor 338 in FIG. 3.

The charge pump voltage Vcp operates to turn the first power FET 318 on (Ron). Once turned on (e.g., once the gate signal has reached the cut-off voltage of the transistor), the gate-source voltage (Vgs) of the first power FET 318 changes based on voltage variations of the data signal. For example, the bit (level) values of the data signal may be superimposed on, or combined with, the parasitic voltage at node N1. In this way, the data signal changes the gate-source voltage Vgs of the power FET 318, so that the power FET 318 outputs from its source terminal a power signal that has been modulated with the data values of the data signal. This may be further explained as follows.

Inputting the data signal into the gate of the first power FET 318 causes a change in gate-source voltage Vgs of the power FET. In order to keep the power FET (which, for example, may be considered as a power switch) in the on state, Vgs may be maintained at approximately 5V. This may be accomplished through a floating gate of the first power FET 318, which may have a varying voltage of "Vs+5V" corresponding to the transferred power. According to another approach, the gate voltage of the first power FET 318 may be fixed to a predetermined voltage using, for example, a clamp circuit. In this case, FET 318 may have, for example, Vg=10V for a fixed 5V voltage of VD~$V_S$. Modulating the gate-source voltage Vgs will, in turn, modulate the current Idc of the power FET, by changing the on-state resistance (Ron) of this FET. Any voltage difference (ΔV) across the gate-source junction of the power FET will generate a current difference (Δi), which, in turn, will generate voltage difference ΔV=Δi*Req, where Req may be the equivalent load resistance at the operating (e.g., communication) frequency.

The following values may correspond to one example of a practical implementation of the first chip 10 used in a communication system: V=5V as the on-state voltage of the first power FET, Idc=0.2 A, equivalent load resistance $R_L$=5V/1 A=5Ω, parasitic capacitance Cp~100 pF, load capacitance $C_L$~1 µF, and fcomm=1 MHz resulting in a capacitor impedance of approximately 1/(2*3.14*1M*1µ)

~0.150. That means a Δi of 10 mA (e.g. 5% of 0.2 A of DC current) may provide a voltage swing (e.g., generated when the data voltages data are modulated onto the 5V power signal) of ~10 mA*0.15 ohm~1.5 mV. This voltage swing is detectable by the circuits of the second chip, that is coupled to the first chip through the single-wire conductor. A difference voltage swing value (e.g., in the mV range) may be achieved in another embodiment. The modulated power signal 338 generated by the first chip is sent to the second chip through pin 337 of the first chip and the single-wire conductor 350. The single-wire conductor may be an alternating current (AC) line or a direct current (DC) line, for example, depending on the type of power signal.

The second chip 360 may include a demodulator 365, a receiver 375, a second power FET 370, and a data receiver 375. The receiver may receive the modulated power signal 338 through a pin 355 coupled to the single-wire conductor 350. Once received, the modulated power signal may be demodulated to separate the data signal from the power signal, and then these signals may be routed along respective signal paths within the second chip. The demodulation may be performed in a functionally inverse manner as the modulation was performed. For example, varying levels of voltage (or current) relative to the power voltage of 5V may be detected as data values of the data signal. The demodulator 365 can be at the end of receiver 375 or part of it, depends on the demodulation scheme and the designed circuit.

The power signal may be routed through the second power FET 370 and the data signal may be routed to the data receiver 375. A second controller 382 may generate a control signal S2 for controlling the gate voltage of the second power FET. For example, the control signal S2 may control the gate voltage meet or exceed the cut-off frequency of second power FET, in order to turn it on. The first controller 381 and the second controller 381 may be included in respective ones of the first and second chips, on a printed circuit board supporting these chips, or may be located remotely from and communicatively coupled to one or more of these chips.

The control signal S2 may be turned on based on a timing that coincides with receipt and demodulation of the signal received from the first chip over the single-wire conductor. When the second power FET is turned on, the power signal is output to a load 390 through pin 388 of the second chip. The load is illustratively shown as including resistance $R_L$ and load capacitance $C_L$. The power signal may also be used to power the second chip.

The data receiver 375 receives the data signal from the demodulator and detects the varying values of the data signal in order to recover the bit (or signal level) values of data transmitted from the first chip 310. These bit/level values may then be used for an intended application of the second chip. Examples of the data receiver 375 are discussed in greater detail below. Irrespective of which type of data receiver is used, the sensitivity of the data receiver must be sufficient to detection variations in the modulated power signal (or the stripped off portion of the modulated power signal corresponding to the data signal) in an associated voltage range within which the data values vary. In one example, this range may include the millivolt (mv) range but may be a different voltage range in another embodiment.

Figure 4:
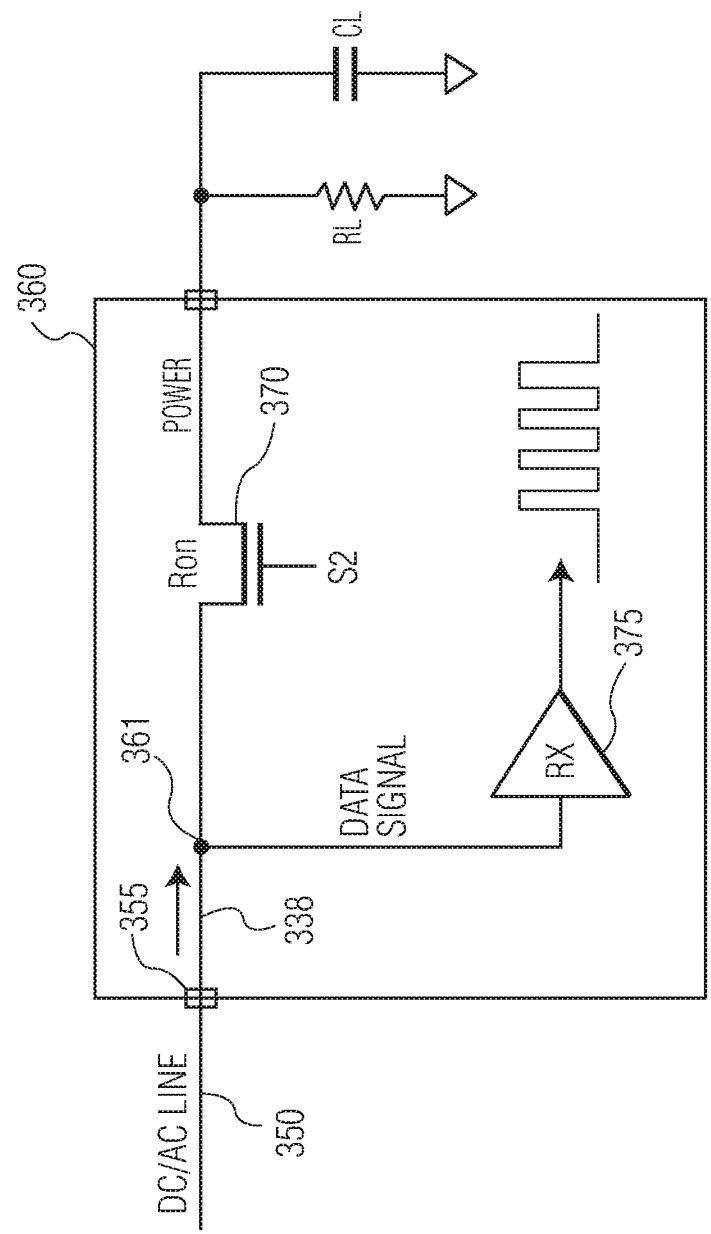
FIG. 4 illustrates another type of signal receiver.

FIG. 4 illustrates an arrangement of the second chip 360 which includes a divider that separates a portion of the modulated power signal received through pin 355. The divider may simply be a node 361 which couples the second power FET in parallel with the data receiver 375, which performs a data recovery function from the modulated power signal.

Figure 5:
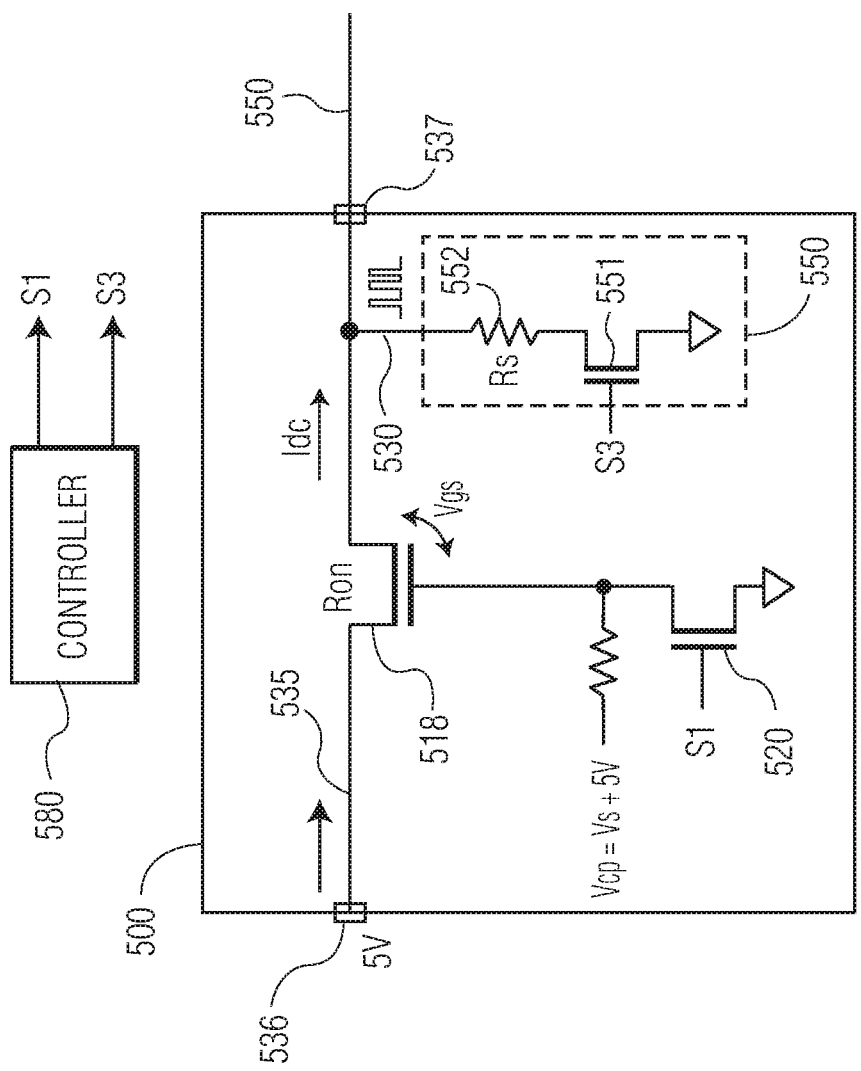
FIG. 5 illustrates another type of signal transmitter over single wire.

FIG. 5 illustrates an arrangement of the first chip 500 which includes a different data source for modulating a data signal on a power signal. Unlike the embodiment of FIG. 3, the data source 550 is coupled between the drain of power FET 518 and the output pin 537 of the chip, that is coupled to the single-wire conductor 550 which carries the modulated power signal to the second chip. The conduction state of the power FET 518 is therefore controlled based on switching of a transistor 520. charge pump voltage Vcp=Vs+5V may be input into the gate of the power FET in the manner previously described, but the coupling capacitor is omitted. The conduction state of the power FET 518 may be controlled by control signal S1 output from a controller 580, which, for example, may correspond to the first controller previously explained.

The data source 550 includes a switching transistor 551 coupled between a resistor (Rs) 552 and a reference potential 553, e.g., ground. When the switching transistor 551 is in the on state, a portion of the current Idc corresponding to the power signal pass through the power FET 518 is diverted through a signal path passing through resistor 552 and transistor 551. (The power may be received through pin 536). The switching transistor 551 may be switched on and off, based on different values of control signal S3 output from the controller 580, to combine (or modulate) the power signal with various data values of a data signal 530. The control signal S3 corresponds to the gate signal of transistor 551. The data values of the data signal may be modulated onto the power signal as follows.

When transistor 551 is turned on, a small amount of current is stolen from Idc that is being transferred through the power line 535. The stolen amount of current may be, for example, 1% to 5% of the current Idc (or any other value that system allows). Stealing this current produces a change in current Δi corresponding to the power signal Idc. For example, the change in current may be Idc−Δi, where Δi is approximately equal to $V_{DC}/R_S$ and where $V_{DC}$ equals the power to be supplied, e.g., 5V. The change in current Idc−Δi may be converted to a voltage difference ΔV in the power signal, which voltage difference may be measured in the second chip during demodulation and recovery of the data. In one case, ΔV=Δi*Req as previously explained.

Thus, a logical zero bit value in the data signal may be detected in the second chip when a portion of the current of the power signal is reduced by Δi (when control signal S3 turns transistor 551 on) and a logical one bit value in the data signal may be detected in the second chip when no current change occurs (when control signal S3 turns transistor 551 off). The switching range of transistor 551 may be controlled (e.g., based on the switching frequency of control signal S3) in order to generate the bit values of the data signal. The value of resistor 552 may be being chosen so that Vdc/Rs is approximately 5% of current Idc, e.g., Rs may be approximately 5V/(10 mA), which may be approximately 500 according to one example. Any different percentage of current Idc may be selected in another case.

Figure 6:
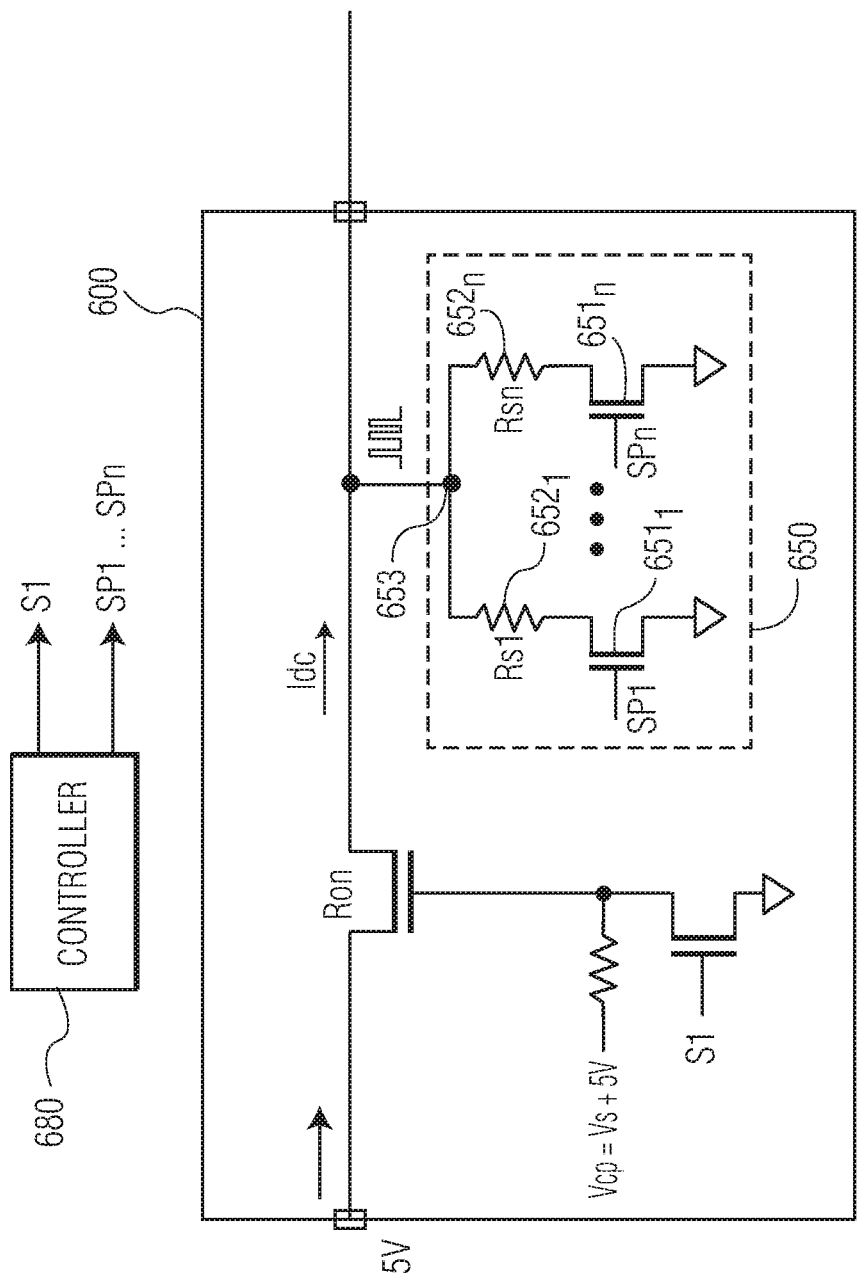
FIG. 6 illustrates another type of signal transmitter over single wire.

FIG. 6 illustrates a chip 600 which includes a data source 650 similar to data source 550 in FIG. 5, except that data source 650 is programmable. For example, data source 650 may include a plurality of resistors $652_1$ to $652_N$ coupled between a common node 653 and a respective plurality of switching transistors $651_1$ to $651_N$. Each of the switching transistors may be coupled to a reference potential. The resistors $652_1$ to $652_N$ have predetermined values which, for example, may be the same values or different values. The transistors in the data source 650 are selectively controlled by a corresponding number of control signals $SP_1$ and $SP_N$, which may turn on and off selected ones of the resistors to attain an overall resistor value, e.g., different combinations of resistors selectively coupled by the transistors may generate different overall resistor values of the data source. The overall resistor value (e.g., like resistor Rs in the embodiment of FIG. 5) controls the change in current of the power signal (by amount Ai as previously explained) to generate respective bit values of the data signal modulated on the power signal that is to be transmitted through the one-wire conductor. The control signals $SP_1$ and $SP_N$ may be output from controller 680, which may also output the control signal S1. Other features of chip 600 may be similar to those in other arrangements described herein.

Figure 7:
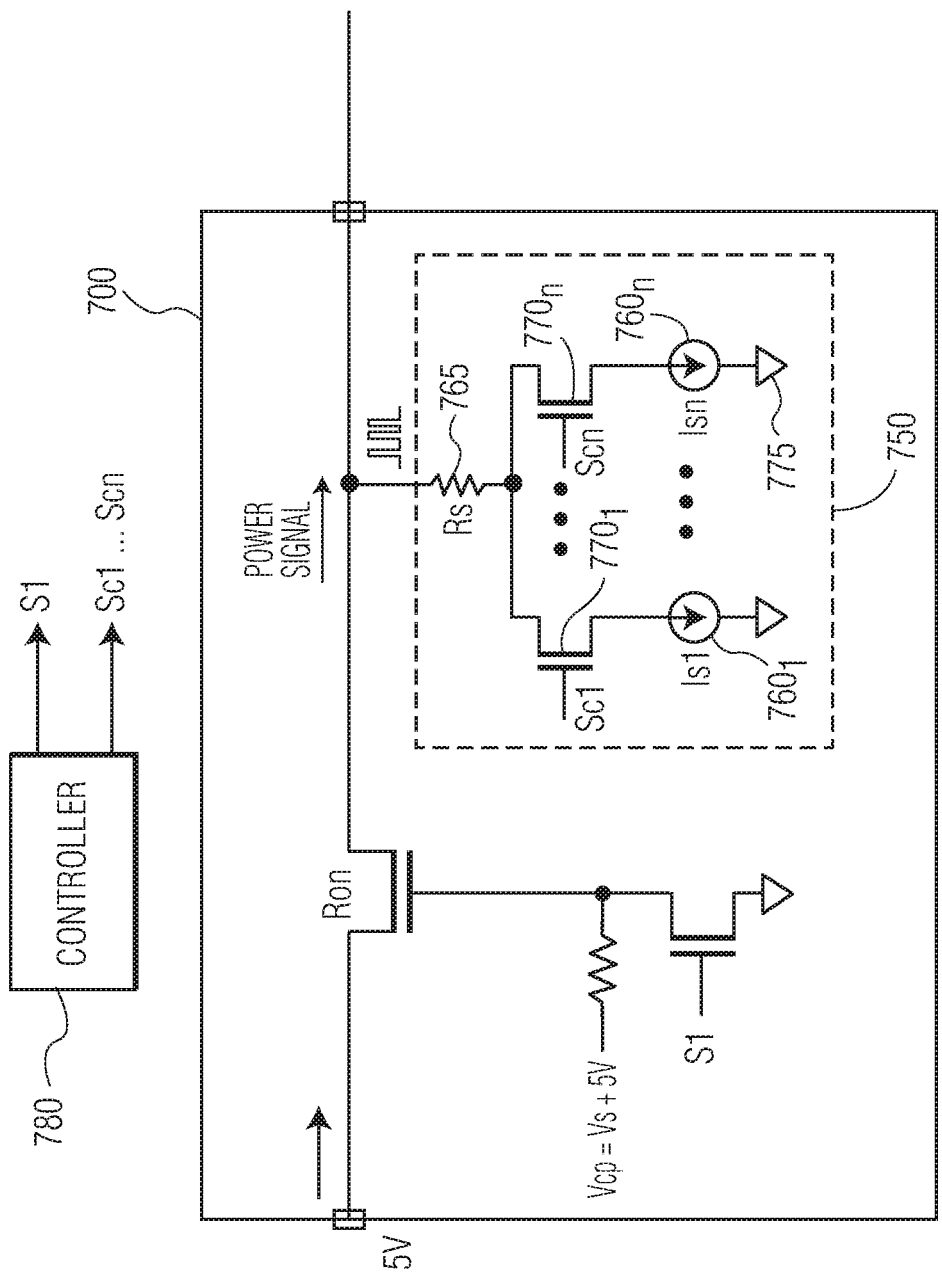
FIG. 7 illustrates another type of signal transmitter over single wire.

FIG. 7 illustrates a chip 700 which includes a data source 750 that includes a plurality of current sources $760_1$ to $760_N$ coupled between a resistor (Rs) 765 and a reference potential 775, e.g., ground. The current sources $760_1$ to $760_N$ generate currents Is1 to Isn that are selectively coupled to a node NA through corresponding ones of the switches $770_1$ to $770_N$, which, for example, may be NMOS transistors. Resistor 765 may have predetermined resistance, which, for example, may be sufficient in order to shield or isolate the switches from the power line. In one case, the resistor may be omitted.

In operation, a controller 780 generates control signals Sc1 to Scn that serve as gate signals to selectively turn on and off corresponding ones of the switches $770_1$ to $770_N$ in various combinations. The switches that are turn on output current from their current sources to node NA, where they are summed to generate a differential current value Δi. By selectively adding the differential current value to the power signal, the data source 750 may generate bit values of a data signal over time, for example, in a manner similar to those in FIG. 5 or 6. For example, controlling the switches to output the differential current value Δi may service to effectively modulate the power signal with a logical one bit value. Controlling the switches to block output of the differential current value may serve to effectively modulate the power signal with a logical zero bit value.

In one case, different combinations of the switches $770_1$ to $770_N$ may be controlled to generate the bit values of the data signal. For example, selectively turning on a first combination of switches may cause a first differential current value to be generated for modulating the power signal with a logical zero bit value. Selectively turning on a second combination of switches may cause a second differential current value to be generated for modulating the power signal with a logical one bit value. In this way, the data source 750 may be considered to generate one or more programmable differential current values for purposes of generating a modulated power signal.

In one case, the programmable current source of data source 750 may provide one or more programmable communication signal levels which can satisfy different speed requirements for the communication system. For example, with N switches and corresponding current sources, N different combination of switches $770_1$ to $770_N$ may be controlled to generate corresponding N different signal levels, which, for example, may correspond to different communication signal levels. In one embodiment, the control signals Sc1 to Scn may be logically combined, for example, using one or more AND gates in order to generate the different switching combinations.

Once generated, the modulated power signal is output to the second chip (or another device or destination) through the single-wire conductor 730. Other features of chip 700 may be similar to those in other arrangements described herein.

The circuits illustrated in FIGS. 5-7 are only able to communicate data, when the power switch is on. If it is off, then there is power signal to modulate, and hence when the power is off no communication is possible. One or more of the following embodiments may be used to overcome such a problem by allowing for communication even when the power transistor and power are turned off.

Figure 8A:
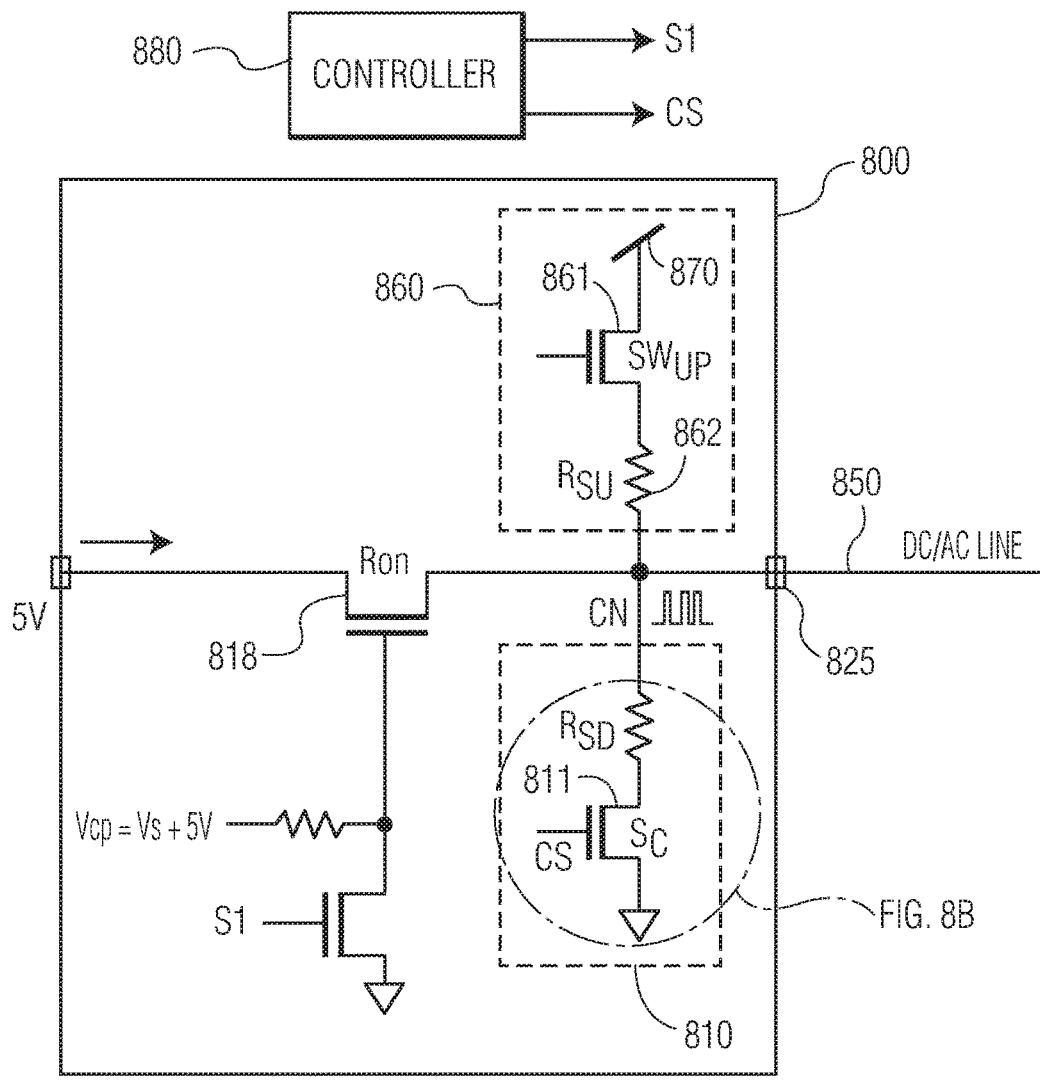
FIG. 8A illustrates an embodiment of another type of a signal transmitter.

FIG. 8A illustrates an embodiment of a chip 800 which includes a data source 810 corresponding, for example, to any of the embodiments of FIG. 5, 6, or 7. As an example, the data source of the FIG. 5 embodiment has been depicted. Also included is a control circuit for controlling the output of the chip. In one embodiment, the control circuit includes a pull-up circuit 860 that controls the voltage on the output pin 825 of the chip coupled to the single-wire conductor 850. The pull-up circuit may be activated based on the operational state of the power FET 818, and specifically during at least a period when the power FET is in the off state. The operational aspects of these circuits may be as follows.

The pull-up circuit 860 includes a switch (SWup) 861 and a pull-up resistor (Rsu) 862. The switch may be, for example, an NMOS transistor which is controlled based on a control signal CS from a controller 880, which may also generate control signal S1 for controlling the conduction state (on/off state) of the power FET 818. When the power FET is in the off state, modulating the power signal by varying Vgs of the power FET will not work properly because the DC current will be zero. Therefore, the data source used in the embodiment of FIG. 8 may be different from the data source in the FIG. 3 embodiment.

Referring to FIG. 8A, when the power FET 818 is in the on state, control signal CS will have a first value to set switch 861 to be off in order to allow a modulated power signal to be generated in a manner previously described. Conversely, when the power FET 818 is in the off state, control signal CS will have a second value to set switch 861 to be on. When switch 861 is on, a voltage source 870 is coupled to the power line through pull-up resistor 862 to effectively pull up the voltage on the power line (coupled to the output pin 825) to a predetermined voltage while the power FET is off. Pulling up the voltage of the power line allows data to be transmitted through the one-wire conductor when the power FET is in the off state. This may be accomplished, for example, by modulating the voltage supplied by voltage source 870 with the data values of a data signal, for example, as illustrated in FIG. 2C. The pull-up circuit, therefore, permits improved performance of the system by allowing data signals to be communicated over the one-wire conductor when the power FET is off. The voltage source may be a 5V source or a source providing another voltage.

1. The controller 880 is able to control the on/off state of switch 861 in synchronism with the on/off state of the power FET based on instructions executed by the controller, e.g., the instructions may cause the controller to generate the values of signals S1 and CS in combination with one another as indicated herein. In at least one embodiment, the states of the power FET in the second chip may be controlled to coincide with the states of the power FET in the first chip. The same may be true for other embodiments illustrated in other figures described herein.

The data source 810 may be controlled based on control signal CS to switch transistor 811 on and off to generate the data values of the data signal. This causes a voltage $V_L$ to be generated, where $V_L = V_{DD}*(R_{SD}/R_{SU}\pm R_{SD}))$. This means that a bit sequence of communication data (comprised of a pattern of 0s and 1s) may turn to $V_{DD}/V_L$ levels on the power line coupled to the one-wire interface 850. As illustrated in FIG. 8, the data source 810 and the pull-up circuit 860 are coupled at a common node CN, which is coupled to the output pin 825. In this configuration the resistors Rsu and Rsd may be considered to form a resistor divider circuit.

Figure 8B:
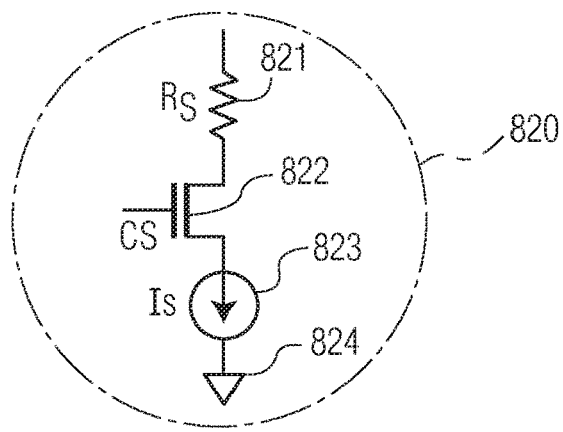
FIG. 8B illustrates an embodiment of a different type of data transmitter for the signal transmitter of FIG. 8A.

FIG. 8B illustrates an embodiment of a different type of data source 820 that may be used in chip 800 of FIG. 8A. This data source includes a resistor 821, a switch 822, and a current source 823 coupled between a reference potential 824 (e.g., ground) and node CN. The switch 822 may be an NMOS transistor which is switched based on gate control signal CS output from controller 880. When switch 822 is turned on, the current source 823 generates a differential current Δi that is coupled to the power line through resistor 821. When switch 822 is turned off, this differential current Δi is different or absent. As a result, and as previously described relative to the various Δi embodiments described herein, a data signal may be modulated onto the power signal In one embodiment, when compared to data source 810, the data source 820 may have the following parameters: $Rs<<R_{SU}$ and $V_L \sim V_{DD}-R_{SU} \cdot I_S$ will be the $V_L$ of the communication.

In the embodiments of FIGS. 8A and 8B, values of the resistors and current source of the data source may be selected, for example, to satisfy requirements of the intended application, e.g., the speed and signal level requirements of communication signal. In at least one embodiment, the communication bandwidth (BW) may be limited by Req*Ceq in when the power FET 818 is in the on and off states, where Ceq is the equivalent capacitance of the one-wire conductor, through which communication is occurring, or the equivalent capacitance at node 825.

The embodiments of FIGS. 8A and 8B may be considered to correspond to a signal generator which includes the power transistor 818, a modulator, and the pull-up circuit 860. As previously explained, the power transistor 818 outputs a power signal to the power line coupled to output pin 825. The modulator includes node CN which superimposes first data values from the data source 810 onto the power signal in a first mode (e.g., when the power transistor is in an on state) and superimposes second data values onto a voltage signal output from the pull-up circuit 860 in a second mode (e.g., when the power transistor is in the off state). Thus, through the pull-up circuit, the data source is able to continue transmitting data on the one-wire conductor when the power transistor is in the off state, e.g., as a result of the second data values modulating the voltage signal. Thus, the signal generator couples a modulated power signal to the one-wire conductor in the first mode and a modulated voltage signal to the one-wire conductor in the second mode. Thus, in accordance with one or more embodiments, the node CN may be considered to be included in the modulator architecture, with or without the data source and the voltage source in respective ones of the first and second modes. The data source in FIGS. 8A and 8B may be replaced with other types of data sources as described herein, including but not limited to the programmable data sources and/or ones that are selectively switched as previously discussed. Also, generation of the modulated power signal may be performed in accordance with any of the arrangements herein.

Figure 9:
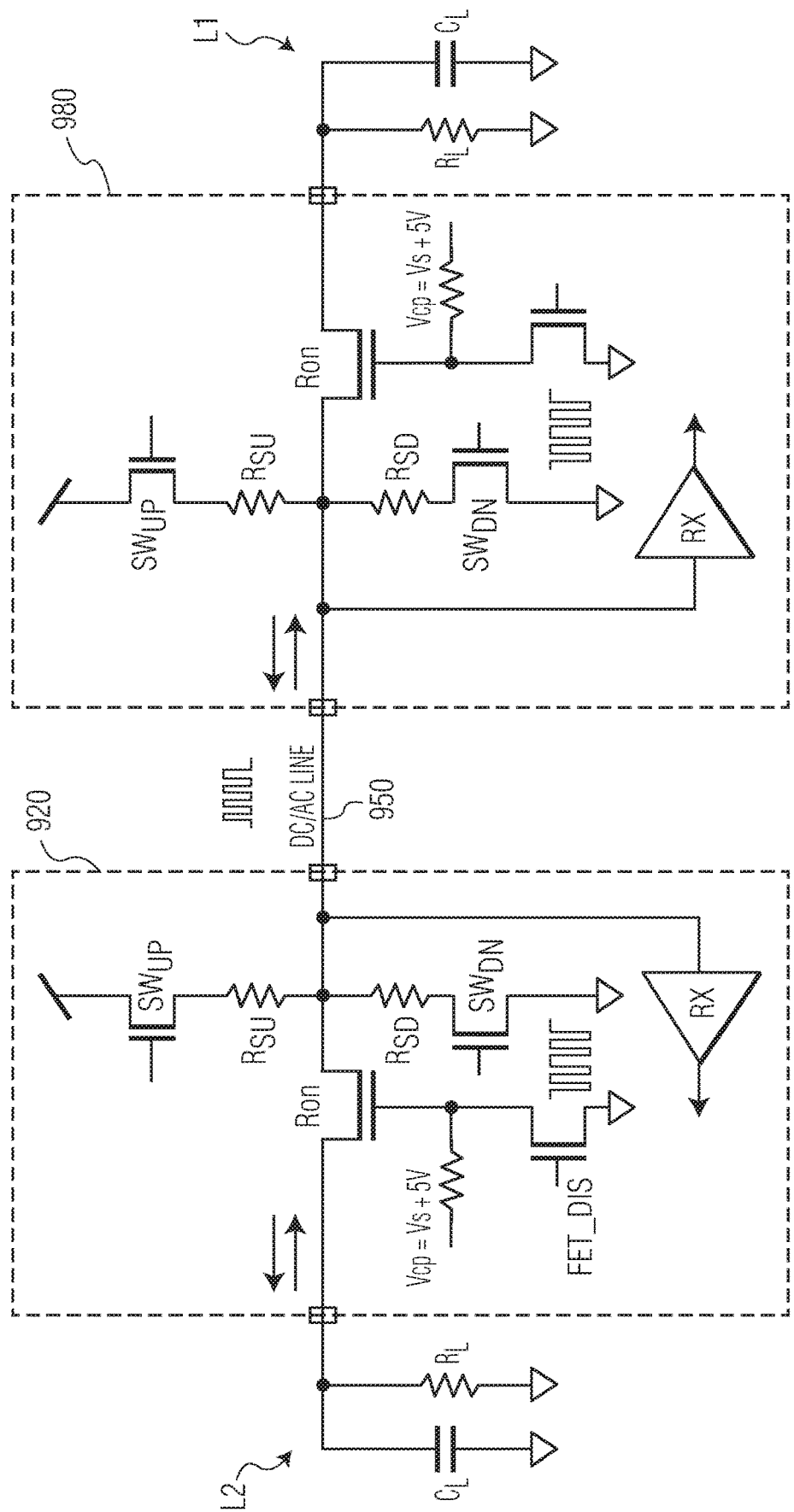
FIG. 9 illustrates an embodiment of a signal transmitter/receiver system with a one-wire interface.

FIG. 9 illustrates an embodiment of a system for generating modulated power signals that supports full-duplex communications of data signals. The systems include chips 920 and 980 which communicate with one another over a single-wire conductor 950. The chips may be mirror images of one another, which each chip having the configuration of chip 800 in FIG. 8A. Also, in this embodiment, the chips 920 and 980 are coupled to respective loads L1 and L2 and exchange different data signals along the single-wire conductor 950 based on their internal data sources and power FET circuits. In another embodiment, other types of data sources as described herein may be used to replace one or both of the data sources illustrated in FIG. 9, with or without the pull-up circuit. In order to implement a programmable transmitter, an array of resistors (or current sources) as previously explained may be used in one or both of the chips.

Figure 10A:
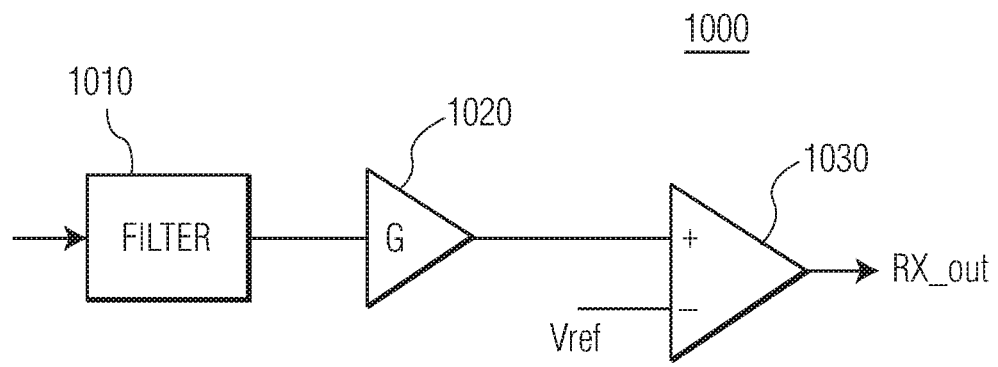
FIG. 10A illustrates an embodiment of a data receiver and FIG. 10B illustrates another embodiment of a data receiver.

FIG. 10A illustrates an embodiment of a data receiver 1000, which, for example, may correspond to data receiver 375 in FIG. 3 or the data receivers in any of the other embodiments described herein, whether in the second chip in a half-duplex implementation or in both chips in a full-duplex implementation. In operation, when the power FETs in both chips are off, the transmitted/received signal level may be relatively high due to a high impedance state of the one-wire conductor (OWI). When the power FETs are on due to a relatively low impedance state (Zeq), the signal level of the modulated power signal may vary, for example, in the my range, which variance is caused as a result of the bit values of the data signal being modulated on the power signal.

Referring to FIG. 10A, data receiver 1000 includes a filter 1010, an amplifier 1020, and a comparator 1030. The filter 1010 may be, for example, a low-pass or band-pass filter that suppresses out-of-band noise and spurious harmonics. The amplifier 1030 may be a low-noise gain stage that amplifies the signal output from the filter by a predetermined gain G. The comparator 1030 compares the amplified signal from the amplifier (which contains the data) to a reference voltage Vref. The reference voltage is set to differentiate between a first voltage range indicative of a logical zero value of a data value (e.g., values less than or equal to Vref) and a second voltage range indicative of a logical one value of a data value (e.g., values greater than Vref). The result of the comparison is output as a 1 or 0 data value.

Figure 10B:
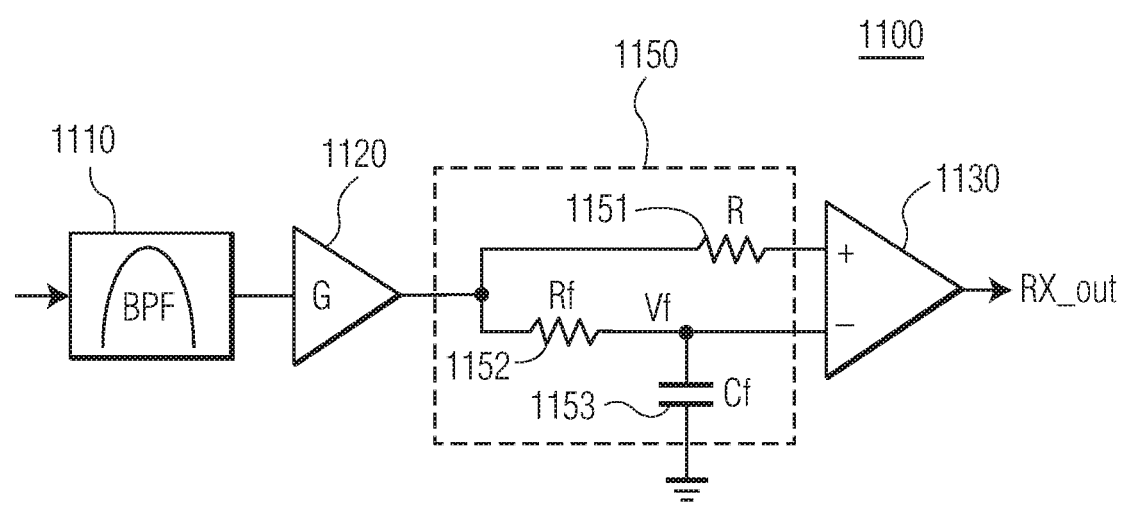

FIG. 10B illustrates another embodiment of a data receiver 1100, which, for example, may correspond to data receiver 375 in FIG. 3 or the data receivers in any of the other embodiments described herein, whether in the second chip in a half-duplex implementation or in both chips in a full-duplex implementation. Data receiver 1100 includes a band-pass filter 1110, an amplifier 1120, and a comparator 1130. The band-pass filter and amplifier may operate in the same manner as the bandpass filter and amplifier of the embodiment of FIG. 10A.

Additionally, the data receiver includes a signal processing circuit 1150 which controls the input of values into the comparator 1130. The signal processing circuit 1150 includes a first resistor 1151 coupled to a first (e.g., non-inverting) input of the comparator and a second circuit coupled to the second (e.g., inverting) input of the comparator. The second circuit includes a resistor (Rf) 1152 and a capacitor (Cf) 1153 coupled in parallel to a node corresponding to a voltage Vf. In one embodiment, the second circuit generates an average of the input signal from the amplifier and compares the average to the signal received in the first input. This arrangement avoids the need for a reference voltage, opting instead to generate an average as the basis for comparison in making the decision as to whether each of the bit values of the received data signal is a logical 0 or 1. The output of the data receivers of FIGS. 10A and 10B may, for example, be passed through a decoder and/or de-serializer and then to the digital processing section of the associated chip for further processing.

In accordance with one or more of the aforementioned embodiments, systems and methods are provided for controlling the communication of data signals and power over a one-wire interface between devices. The one-wire interface may be a one-wire power line coupled to a power pin of a chip. Transmitting data signals in half-duplex or full-duplex mode over the power line (e.g., into the power pin) of a chip reduces the pin requirement for the chip. For example, instead of providing separate pins for power and data, one or more embodiments described herein allow for the use of one pin to transmit/receive power and data over a one-wire transmission line. Reducing pin requirements may increase circuit and communication efficiency, and at the same time reduce the costs associated with manufacturing and implementing the chip. Also, one or more embodiments may be implemented for a low power, small circuit area that has a simple design with low complexity.

In one or more embodiments, a processor may be used to control the on/off states of one or more power FETs for purposes of communicating data (and/or control) signals over the single-wire communication line. The data (and/or control signals) may be transmitted over this line when the power FETs are switched to the on state and to the off state. Moreover, the signal level(s) of the data (and/or control) signals may be adjusted to within one or more predetermined system tolerances using DC power for performing AC communications over the line. Additionally, in one embodiment the communication signal level (amplitude) and/or speed may be controlled (e.g., programmed) to, for example, comport with requirements of any intended application.

The sources, modulators, filters, processors, controllers, distributors, demodulators, and other signal-generating and signal-processing features of the embodiments disclosed herein may be implemented in logic which, for example, may include hardware, software, or both. When implemented at least partially in hardware, the sources, modulators, filters, processors, controllers, distributors, demodulators, and other signal-generating and signal-processing features may be, for example, any one of a variety of integrated circuits including but not limited to an application-specific integrated circuit, a field-programmable gate array, a combination of logic gates, a system-on-chip, a microprocessor, or another type of processing or control circuit. The term coupling may refer to a direct connection or an indirect connection between two or more elements as described herein.

When implemented in at least partially in software, the sources, modulators, filters, processors, controllers, distributors, demodulators, and other signal-generating and signal-processing features may include, for example, a memory or other storage device for storing code or instructions to be executed, for example, by a computer, processor, microprocessor, controller, or other signal processing device. The computer, processor, microprocessor, controller, or other signal processing device may be those described herein or one in addition to the elements described herein. Because the algorithms that form the basis of the methods (or operations of the computer, processor, microprocessor, controller, or other signal processing device) are described in detail, the code or instructions for implementing the operations of the method embodiments may transform the computer, processor, controller, or other signal processing device into a special-purpose processor for performing the methods herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Although the various exemplary embodiments have been described in detail with particular reference to certain exemplary aspects thereof, it should be understood that the invention is capable of other example embodiments and its details are capable of modifications in various obvious respects. As is apparent to those skilled in the art, variations and modifications can be affected while remaining within the spirit and scope of the invention. The embodiments may be combined to form additional embodiments. Accordingly, the foregoing disclosure, description, and figures are for illustrative purposes only and do not in any way limit the invention, which is defined by the claims.

We claim:

1. A signal generator, comprising:
   a power transistor configured to output a power signal to a power line;
   a modulator configured to modulate the power signal with first data values in a first mode to generate a modulated power signal, the modulator coupled to output the modulated data signal to a one-wire interface; and
   a pull-up circuit configured to apply a voltage signal to the power line in a second mode, the voltage modulated with second data values to generate a modulated voltage signal coupled for transmission to the one-wire interface,
   wherein the first data values correspond to variations in a voltage level of the modulated power signal in the first mode and the second data values correspond to variations in a voltage level of the modulated voltage signal in the second mode.

2. The signal generator of claim 1, wherein:
   the first mode includes a period when the power transistor is in an on state; and
   the second mode includes a period when the power transistor is in an off state.

3. The signal generator of claim 2, wherein the modulator further comprises:
   a data source coupled to the power line and configured to provide the first data values and the second data values.

4. The signal generator of claim 3, wherein:
   the pull-up circuit and the data source are coupled to a same node, and
   the node is coupled to an output terminal of the power transistor.

5. The signal generator of claim 3, wherein the data source includes:
   at least one transistor coupled between a reference potential and the power line,
   wherein the at least one transistor includes a gate coupled to a data source and is configured to control generation of the first data values in the first mode and the second data values in the second mode.

6. The signal generator of claim 3, wherein the data source includes:

at least one transistor coupled between a current source and the power line, wherein the at least one transistor includes a gate coupled to a data source and is configured to control generation of the first data values in the first mode and the second data values in the second mode.

7. The signal generator of claim 3, wherein:

the modulator includes a node coupled to the data line, and the node superimposes the first data values from the data source onto the power signal in the first mode.

8. The signal generator of claim 3, wherein:

the power line is coupled to a node, the node is coupled to the pull-up circuit and the data source, and the node superimposes the second data values from the data source onto the voltage signal in the second mode.

9. The signal generator of claim 3, wherein:

the power line is coupled to a node, the node is coupled to the data source and the pull-up circuit, and the node superimposes the first data values from the data source onto the power signal in the first mode and superimposes the second data values from the data source onto the voltage signal in the second mode.

10. The signal generator of claim 3, wherein:

the power line is coupled to a node, the node is coupled to the pull-up circuit and the data source, and the node superimposes the second data values from the data source onto the voltage signal in the second mode.

11. A method for controlling signal communications, comprising:

outputting a power signal to a power line;

modulating the power signal with first data values in a first mode to generate a modulated power signal;

modulating a voltage signal on the power line in a second mode to generate a modulated voltage signal;

coupling the modulated power signal to a one-wire interface in the first mode; and coupling the modulated voltage signal to the one-wire interface in the second mode, wherein the first data values correspond to variations in a voltage level of the modulated power signal in the first mode and the second data values correspond to variations in a voltage level of the modulated voltage signal in the second mode.

12. The method of claim 11, wherein:

the first mode includes a period when a power transistor coupled to the power line is in an on state; and the second mode includes a period when the power transistor is in an off state.

13. The method of claim 12, further comprising:

outputting the first data values and the second data values from a data source to the power line.

14. The method of claim 13, wherein the voltage signal is received from a pull-up circuit coupled to the power line.

15. The method of claim 14, wherein:

the pull-up circuit and the data source are coupled to a same node, and the node is coupled to an output terminal of the power transistor.

16. The method of claim 13, wherein the data source includes:

at least one transistor coupled between a reference potential and the power line, wherein the at least one transistor includes a gate coupled to a data source and is configured to control generation of the first data values in the first mode and the second data values in the second mode.

17. The method of claim 13, wherein the data source includes:

at least one transistor coupled between a current source and the power line, wherein the at least one transistor includes a gate coupled to a data source and is configured to control generation of the first data values in the first mode and the second data values in the second mode.

18. The method of claim 13, wherein:

the power line is coupled to a node, the node is coupled to the data source and a pull-up circuit of the voltage signal, and the node superimposes the second data values from the data source onto the voltage signal in the second mode.

19. The method of claim 13, wherein:

the power line is coupled to a node, the node is coupled to the data source and a pull-up circuit of the voltage signal, and the node superimposes the first data values from the data source onto the power signal in the first mode and superimposes the second data values from the data source onto the voltage signal in the second mode.

* * * * *